(12) United States Patent
Allen et al.

(10) Patent No.: US 8,832,165 B2
(45) Date of Patent: Sep. 9, 2014

(54) COMPUTER SYSTEMS AND METHODS FOR QUANTUM VERIFICATION AND VALIDATION

(75) Inventors: Edward H. Allen, Bethesda, MD (US); Greg S. Tallant, Hudson Oaks, TX (US); Mark A. Elliot, Endicott, NY (US)

(73) Assignee: Lockheed Martin Corporation, Bethesda, MD (US)

(\*) Notice: Subject to any disclaimer, the term of this patent is extended or adjusted under 35 U.S.C. 154(b) by 849 days.

(21) Appl. No.: 12/954,092

(22) Filed: Nov. 24, 2010

(65) Prior Publication Data

US 2011/0238378 A1 Sep. 29, 2011

Related U.S. Application Data

(63) Continuation-in-part of application No. 12/127,540, filed on May 27, 2008.

(60) Provisional application No. 61/013,291, filed on Dec. 12, 2007.

(51) Int. Cl.
*G06F 7/00* (2006.01)
*G06N 99/00* (2010.01)
*B82Y 10/00* (2011.01)

(52) U.S. Cl.
CPC .............. *G06N 99/002* (2013.01); *B82Y 10/00* (2013.01)

USPC .......................................................... 708/200

(58) Field of Classification Search
None
See application file for complete search history.

(56) References Cited

U.S. PATENT DOCUMENTS

| | | | |
|---|---|---|---|
| 2008/0140749 A1 | 6/2008 | Amato et al. | |
| 2009/0070546 A1* | 3/2009 | Choudhury et al. | 711/207 |
| 2009/0070629 A1* | 3/2009 | Arora et al. | 714/32 |
| 2009/0157778 A1 | 6/2009 | Allen et al. | |
| 2011/0238378 A1 | 9/2011 | Allen et al. | |
| 2011/0238855 A1 | 9/2011 | Korsunsky et al. | |
| 2011/0243411 A1 | 10/2011 | Weiner et al. | |
| 2013/0060536 A1* | 3/2013 | Sukup et al. | 703/2 |

\* cited by examiner

*Primary Examiner* — David H Malzahn
(74) *Attorney, Agent, or Firm* — Baker Botts L.L.P.

(57) ABSTRACT

Systems and methods are disclosed for quantum verification and validation of cyber-physical systems that include a quantum allegory generator that maps a specification for the system undergoing verification and validation testing to a thermodynamical allegory. A hybrid classical-quantum processing system in which a quantum processing system serves as the oracle of the classical processing system and uses the thermodynamical allegory to determine whether there is a set of variable settings that satisfy the thermodynamical allegory. The presence and location of faults can be determined based on characteristics of the set of variables that satisfy the thermodynamical allegory, if the variables exist.

28 Claims, 4 Drawing Sheets

COMPUTER SYSTEMS AND METHODS FOR QUANTUM VERIFICATION AND VALIDATION

BACKGROUND

A crucial need arising in the development of complex hardware and software systems is to streamline Verification and Validation (V&V) procedures used to identify and eliminate design and implementation faults. For many systems, V&V is conducted on cyber-physical systems that can include hardware, software, and human operators in the loop. No one has ever developed a procedure to eliminate all errors from engineered systems, so the level of effort in conducting V&V is usually dictated by achieving an acceptable probability of correctness or, complementarily, an acceptable likelihood of failure. The V&V plan for large, complex systems tends to require ongoing adjustments, making it difficult to reliably estimate the cost of the V&V effort. These uncertainties can lead to cost overruns and delivery delays.

A quantum computer is a device that manipulates quantum bits (qubits) rather than classical bits that can be used to solve problems similar to those solved by classical computers. In a classical computer, each bit is represented by some physical device that is either off or on. The capability to compute difficult problems using classical computers is proportional to the number of instructions the computer can execute per unit of time. Classical computers can therefore be limited in procedures that use a very large number of steps to determine an answer. V&V of software in complex systems is such a problem. For example, the control system software of the F-35 aircraft comprises millions of lines of code. Investigating all potential errors in the code using classical methods may require more computational resources than are realistically feasible.

SUMMARY

In some embodiments, a computer system comprises an oracle machine including a control computer and a quantum processing system that serves as an oracle to the control computer. A quantum allegory generator maps a specification for a system undergoing verification and validation testing to a thermodynamical allegory. The quantum processing system is configured to run the thermodynamical allegory to determine whether there is a set of variables that satisfy the thermodynamical allegory. If there is a set of variables that satisfy the thermodynamical allegory, the computer system determines whether the system encoded by the thermodynamical allegory has one or more faults.

In other embodiments, methods are disclosed that include receiving information for a system to be tested; and determining whether the system can be tested using a classical computer system. If the system cannot be tested using a classical computer system, the methods further include generating a quantum allegory of the system in the form of a thermodynamical allegory from the information; and running the thermodynamical allegory in a quantum simulator as an oracle to the classical computer system to determine whether the system is likely to incur a failure during operation.

In further embodiments, simulation and processing systems are disclosed that include a quantum allegory generator which maps information for a system undergoing verification and validation testing to a quantum allegory. A quantum computer or simulation system executes the quantum allegory in forward and in reverse. A results interpreter determines that the system is likely to be free of errors within a specified probability when the quantum allegory generates repeatable solutions in forward and in reverse operation.

BRIEF DESCRIPTION OF THE FIGURES

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Systems and methods disclosed herein use a novel combination of classical and quantum computing resources to simulate a particular implementation of a cyber-physical system (CPS). The simulation (also referred to as computer system or processing system) is used to determine whether the implementation of the CPS meets a set of specifications or requirements. Although fault-free performance of a CPS implementation may not be guaranteed, the performance of the CPS can be verified and validated to an acceptable level of confidence in a much shorter time period than using classical computers alone. Additionally, levels of confidence may be achieved for sufficiently large problems that are intractable for classical computers.

Figure 1A:
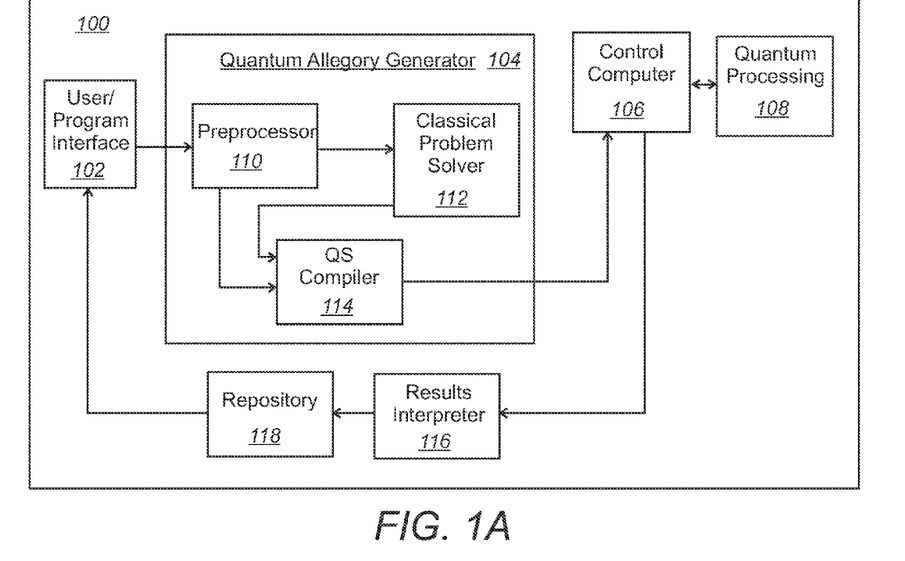
FIG. 1A is a diagram of components included in an embodiment of a quantum verification and validation system for cyber-physical systems.

Referring to FIG. 1A, a diagram of components that can be included in an embodiment of a quantum verification and validation system 100 is shown including a user or program interface 102, a quantum allegory generator 104, a control computer 106, a quantum processing system 108, a results interpreter 116, and a repository 118. Quantum allegory generator 104 can include a preprocessor 110, a classical problem solver 112, and a quantum system compiler 114.

Alan Turing introduced the concept of an oracle machine, which is a Turing machine connected to an oracle. (Turing, 'Systems of Logic Based on Ordinals', Proceedings of the London Mathematical Society, series 2, vol. 45 (1939): 161-228). As defined by Turing, an oracle can be thought of as an entity capable of answering some group of questions. An oracle machine can perform the same operations as a regular Turing machine, and can also query the oracle for an answer to a question that cannot be computed by the Turing Machine for whatever reason. The oracle machine generates output using a step-by-step procedure that repeatedly applies a small, fixed number of operations. In FIG. 1A, control computer 106 functions as the Turing machine while quantum processing system 108 functions as the oracle.

While a Turing machine follows rote procedures to calculate answers, an oracle offers knowledge to help out when the Turing machine is stumped. Because the Turing machine has access to all of mathematics and yet it is inferior to the oracle, the oracle is a source of heuristic aids not held to ordinary laws of logic, mathematics, or computer science. Oracles are not deterministic by definition. Quantum allegories as referred to herein are the most general class of such heuristic aides, provided the allegories encompass all of known relativistic quantum physical systems, as implied by the use of the thermodynamical theory. The term "allegory" refers to the temporal and spatial evolution of a quantum physical system.

As disclosed herein, non-computable problems can be solved with a Turing machine (such as classical control computer 106) in combination with infinite-register quantum computers coupled to consult with an oracle (such as quantum processing system 108) that is able to modify the Turing machine consulting it. The oracle can be a thermodynamical processor that accesses a larger dimension set than the binary set accessed by the Turing machine and includes potentially new elements beyond those accessed by the Turing machine.

In two famous theorems derived by Kurt Gödel in the early part of the $20^{th}$ century, and elaborated over the ensuing decade by the founders of computer science, the general problem of V&V of any computer program was found to be unsolvable. In mathematical complexity theory, P defines the class of computable problems that are solvable in time bounded by a polynomial function of the size of the input. NP is the class of computable problems for which a solution can be verified in polynomial time. Polynomial time can be thought of as a synonym for "quickly", "tractable", and/or "feasible". A computable problem lies in the class called NP-Complete if every problem that is in NP can be reduced to the computable problem in polynomial time. "Uncomputable" refers to problems which are said to be "NP-Hard". The term "unsolvable" as used herein refers to non-deterministic polynomial-time (NP) hard problems. Non-deterministic problems allow for multiple choices for the next step of computation at every step, creating many possible computational paths. These problems do not arrive at a solution for every possible computational path, but arrive at a correct solution for some path if the right choices are made along the way. According to Gödel's theories, perfectly error-free software is not a possibility. However, as described herein, when the underlying cybernetic (procedural) component of a system can be mapped one-to-one onto a tangible physical system, the evolutionary behavior of the procedural component and the physical systems is mutually homologous and thus there exists a physical approach to V&V when a classically computable approach is not feasible. Such reflexively inter-mappable homologous systems are referred to herein as cyber-physical systems (CPS). The mapping is called complete if every logical element of the cybernetic procedure (e.g. computer software program) is mapped one-to-one onto some element of the evolutionary behavior of the physical system and vice versa.

Invariance is any property of a mathematical object that does not change under a temporal transformation such as a reversal or a translation in time Symmetry is a corresponding property of a physical object that does not change under a spatial transformation such as translation, rotation, etc. System 100 is based on Noether's Theorem in which symmetry of the action of a physical system has a corresponding conservation law that defines equilibrating forces in time for dynamical systems. Equilibria are states that systems fluctuate about and naturally return to after being disturbed. Noether's Theorem implies restoring forces are rooted in the abstracted formulations of the 2nd Law of Thermodynamics, in which a process is considered reversible if the combined entropy of the system and the environment (e.g., heat transfer and temperature) remain a constant for a given physical process. The $2^{nd}$ Law of Thermodynamics thus establishes the principle of conservation of information. Information in this sense may be defined as the capacity of a system to convey a meaning unambiguously. Given conservation of information, system 100 tests a model to see if any loss of information occurs. Loss of information indicates that a fault cannot be detected in the program/CPS. If the model is reversible then a fault can be detected by testing all invalid outputs and finding a valid input leading to that output. If a model of the computer program or CPS is irreversible, then the program or CPS cannot be verified using system 100.

User/program interface 102 provides data input to preprocessor 110 and receives information from repository 118. The data may be supplied interactively by a user at a workstation or other input device, and/or the data may be stored in a data file on computer memory or storage device. Preprocessor 110 can include a program interface or other means for receiving or accessing the data. Types of data that can be supplied include, but are not limited to, system requirements, specifications, data representing a physical embodiment of a hardware system, and software code.

User/program interface 102 can also access and receive results of verification and validation (V&V) tests from repository 118. The results can indicate whether a fault or failure was detected during the test(s) as well as the state(s) of the system being tested when the fault(s) are detected. The location of the fault(s) can be determined from the state information. Errors in the software program or cyber-physical system (CPS) can be corrected before further production or development of the product.

Preprocessor 110 receives the data defining the system from user/program interface 102 and determines whether the problem or system is computable and should undergo V&V testing using classical computer or problem solver 112. If the problem/system is non-computable, the problem/system should be tested using quantum processing system 108. The preprocessor 110 can also determine that a problem can be split into a computable functional that can be tested on classical problem solver 112 and a non-computable functional that can be tested on quantum processing system 108. A non-computable functional is a function that results in a non-computable real number or is a real non-computable entity. The term non-computable refers to problems that are incapable of being solved by a deterministic or classical algorithm in a finite amount of time with finite computer resources. If preprocessor 110 determines that the problem is non-computable, preprocessor 110 supplies the information and data about the non-computable functional to quantum system (QS) compiler 114.

Quantum allegory generator 104 can be implemented using Optical Lattice Emulators (OLE) to generate a quantum allegory as an oracle to quantum processing system 108. The OLE can emulate computationally intractable, strongly-correlated, many-body models for which there is no verifiable theoretical solution or classical experimental realization. The OLEs can achieve the requirements of a non-computable oracle. The quantum allegory generator 104 can produce a topological order system with some topological invariants. The wave function of topological order systems can be written as a tensor product of the initial non-computable functional and a phase factor.

Preprocessor 110 and classical problem solver 112 can be implemented using any suitable digital processor with hardware, firmware, and/or software components capable of executing logic instructions, receiving input signals, and providing output signals to components in system 100. Preprocessor 110 and classical problem solver 112 can alternatively be a quantum processor operating in classical mode or other suitable deterministic processing system.

Figure 1B:
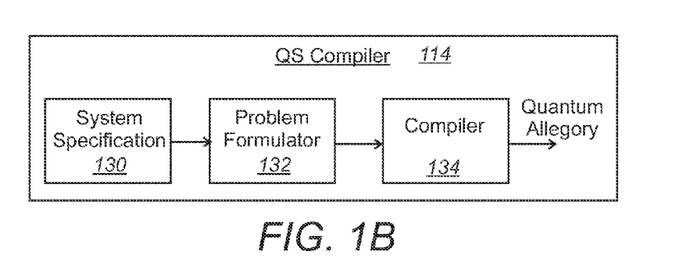
FIG. 1B is a diagram of an embodiment of a quantum system compiler that can be used in the system of FIG. 1A.

Referring to FIG. 1B, a diagram of an embodiment of quantum system (QS) compiler 114 is shown including system specification 130, problem formulator 132, and compiler 134. When a job arrives at compiler 114 from preprocessor 110 or classical problem solver 112, the job can be in the form of a system specification 130 that includes information and data such as a mathematical specification that represents the problem, system requirements, software code, and/or information regarding a particular physical embodiment of the cyber system or cyber-physical system being tested.

Problem formulator 132 prepares a representation of the non-computable functional in thermodynamical form (which can be reduced to logical form for only some non-computable functionals). "Thermodynamical" as used herein refers to a generalized thermodynamic system allowing non-Gaussian statistics and generalized thermodynamic processes (GT processes) where thermodynamic equilibriae are not necessarily attainable in finite time. That is, GT processes obey the Weak Central Limit Theorem (Weak CLT) wherein the first moment is finite and the second and all higher moments are divergent.

The terms simulation or simulator used herein can refer without limitation to a continuous or discrete process, processor, processing system, computer system, and similar variants.

For CPS systems comprised of both mechanical histories and cybernetic evolutions which map onto each other, elements of behavior that operate in the cyber layer can map to an element of behavior that operates in the mechanical layer. So, because the mechanical system's behaviors must comply with natural laws of physics and mechanics, the cyber evolutions must also comply with natural laws of physics and mechanics.

There are several ways to apply physical law to find errors in a system by developing a thermodynamical representation of the CPS and using it as an allegory for the evolution of the system. While classical software does not make sense when read from right to left, bottom to top, an equivalent thermodynamical representation of the software is developed that can be run backward. The output of the thermodynamical representation for a given initial input can be fixed or "clamped" and the representation reversed or run backward to find the input that generated the output. When the representation is run in reverse, something is not correct in the logic of the representation if the derived reverse input is not the same as the initial input. The representative process is not truly reversible because information was lost. Another way to view the concept is that if the thermodynamical representation is invariant, it can be propagated forwards and backwards with repeatable solutions each way, and is therefore free of errors. On the other hand, if the initial input and the derived reverse input are substantially different, the cybernetic component cannot be verified as being free of errors.

Compiler 134 receives a source code representation of the cybernetic system being tested and generates a compact information set in the form of a thermodynamical allegory that is suited for processing in quantum processing system 108. Examples of thermodynamical allegories that can be used as quantum allegories include Quadratic Unconstrained Binary Optimization (QUBO) problems, or other dynamical mechanical scheme. A survey of such schemes is provided by Mark Levi in "The Mathematical Mechanic: Using Physical Reasoning to Solve Problems" (Princeton University Press, 2009). Levi surveys a range of physical, geometric, mechanical, and similar systems that can be used to model and solve mathematical problems often much more simply than by means of axiomatic mathematics, systematized logic, or classical computational procedures. In some embodiments of the present invention, thermodynamical theory is generalized in the sense of thermal physics where the statistics are not limited to Gaussian statistics and may include non-customary extensions of measure theory such as the negative measures. Thermodynamical allegories can be used to represent cyber-physical systems where the physical behavior is confined by the laws of physics and the cyber behavior maps to the physical behavior one-to-one. The thermodynamical allegory can also be structured as a search for singularities in a topological manifold or as a search for irreversibilities in a quantum physical process.

Quantum system compiler 114 can provide the non-computable functional and quantum allegory (e.g., a QUBO problem) to control computer 106. Control computer 106 can be used to queue jobs for quantum processing system 108, provide an interface between quantum processing system 108 and quantum allegory generator 104, and supply the results of the processing in control computer 106 and quantum processing system 108 to results interpreter 116.

Let a measure be established over a set divided into two subsets such that the computable elements are included in one subset and the non-computable elements in the other. In each subset, one or more operators (whether binary or "n-ary") are postulated that implement a property called closure and allow members of the set to be combined and manipulated such that the results of the operation stay within the subset in which they started. Operators that implement movement of elements between subsets, that is, operators that combine elements and map them into subsets other than where they came from, can also be defined.

Control computer 106 can be a Turing machine that overlies a computable subset and exclusively uses operators that accept computable inputs and generate computable outputs. Turing machines are closed within computable space. There can be sufficient Turing machines to entirely cover the set of possible inputs, that is, there is one Turing machine for each element of the power set of computable elements. The number of outputs, however, includes both computable and non-computable outputs because non-computable outputs arise naturally from computable inputs assuming the programs within the Turing machine include the ordinary rules of arithmetic. From these facts, if there are fewer inputs than outputs and the number of Turing machines is defined by the number of inputs, there are fewer Turing machines than outputs. Some outputs will not find a place to rest and the system must be incomplete. Quantum processing system 108 can be used, however, by control computer 106 to operate on thermodynamical allegories, in essence, a quantum physical system for each output. Sufficient diversity to cover the whole set is thus achieved.

To define a quantum physical system for each output, consider that an oracle machine that excludes non-computable elements from its input and open operators from its programs is also closed within the computable subset. However, when the oracle is a stochastic process that may select without restriction from all elements of the global set including non-computable as well as computable elements, the oracle can generate non-computable pronouncements that enable the machine to cross the border between the computable and non-computable subsets to address non-computable problems. The various combinations of allowable inputs, computable and non-computable, and open and closed operators enables system 100 to use extended mathematics that incorporate thermodynamical analogues as well as logical evolutions and thus has the potential to address computable and non-computable problems.

Note that when an element is transported from the non-computable to the computable subset, the element is not changed; the element itself is invariant. All that has changed is the way the element is measured quantum mechanically. For example, pi is a non-computable number when measured in natural digits (whether binary or decimal), but is fully computable when measured in physical units of pi itself (i.e., in trigonometry terms such as 2 pi or 4/3 pi, etc. are used).

Control computer 106 instructs quantum processing system 108 to run the thermodynamical allegory in the forward direction using a given initial input. The quantum processing system 108 reports the processing results to control computer 106. Control computer 106 can then instruct the quantum processing system 108 to run the thermodynamical allegory in reverse using the output derived from the forward execution of the thermodynamical allegory as the starting point. Once the quantum processing system 108 reports the input value derived from the reverse execution, control computer 106 provides the results to results interpreter 116.

Figure 2A:
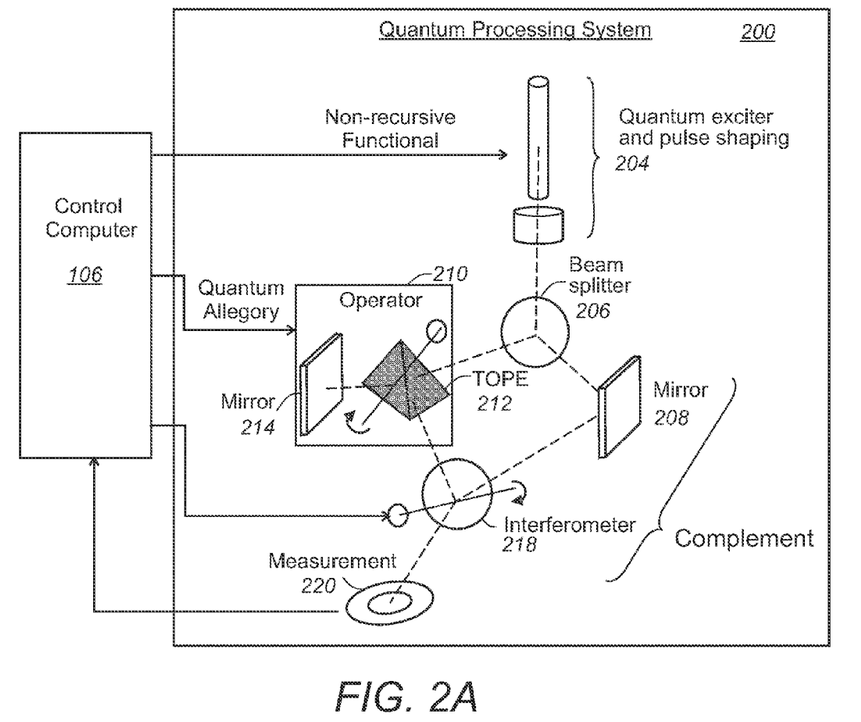
FIG. 2A is a diagram of an embodiment of components included in a quantum processing system using a quantum allegory as an oracle to solve non-computable functions.

Control computer 106 can be implemented using any suitable digital processor capable of executing logic instructions, receiving input signals, and providing output signals to components in systems 100 and 200 (FIG. 2A).

Figure 1C:
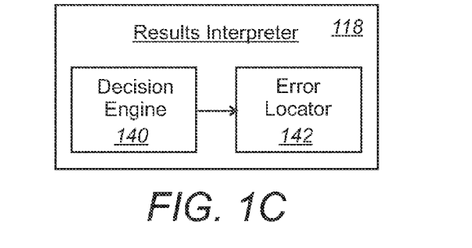
FIG. 1C is a diagram of an embodiment of a results interpreter that can be used in the system of FIG. 1A.

Referring to FIGS. 1A and 1C, an embodiment of a results interpreter 116 is shown in FIG. 1C including decision engine 140 and error locator 142. Decision engine 140 receives the results from control computer 106 and evaluates the results to determine whether a fault occurred. For example, decision engine 140 can derive a probability of correctness P(C) from the results of processing the non-computable functional in control computer 106 aided by the quantum processing system 108. If P(C) is equal to zero, then the representation is not reversible and there is a fault or failure in the cyber-physical system. Additionally, an invariant is a property of a mathematical object that does not change when subject to temporal transformation(s). Results such as information regarding invariants and interim states at which faults occur can also be provided by quantum processing system 200 and control computer 106.

If a fault has occurred, decision engine 140 passes the results to error locator 142 to determine the location where the error occurred in the representation of the cyber-physical system. Knowledge of the location where a fault has occurred allows the problem to be corrected much more quickly than traditional debugging and troubleshooting methods. Additionally, errors that otherwise might not be found at all or not until much later in the development cycle with traditional verification techniques can be brought to light and corrected much sooner. Locating and fixing errors as early as possible during development greatly reduces the cost of verification and validation as the product matures.

QS compiler 114 and results interpreter 116 can be implemented using any suitable digital processor with hardware, firmware, and/or software components capable of executing logic instructions, receiving input signals, and providing output signals to components in system 100. QS compiler 114 and results interpreter 116 can alternatively be implemented using a suitable deterministic processing system, for which purpose a quantum computer can serve as well but is not required.

The output of results interpreter 116, such as whether there is a fault in a particular CPS, the interim states where the fault occurred, and other relevant information, can be stored in repository 118. User/Program interface 102 can access the information as needed. Repository 118 can be implemented using any suitable computer storage medium such as a disk drive, memory stick, flash memory, and/or magnetic or optical recording device.

Referring to FIG. 2A, a diagram of components included in an embodiment of quantum processing system 108 is shown. The quantum processing system 108 determines whether there is a set of input/output variables that satisfy the thermodynamical allegory, and if there is a set of variables that satisfy the allegory, whether the system encoded by the allegory has one or more faults. This may be done, for example, via standard adiabatic quantum computing algorithms for the solution of satisfiability problems.

A non-computable functional is supplied by control computer 106 to quantum exciter and pulse shaper, referred to as quantum system encoder) 204. Quantum system encoder 204 encodes the non-computable functional into a first quantum system. The encoding function may be implemented using attributes such as spin, polarization, or momentum, for example, of quanta such as photons, electrons, atoms, simulated atoms such as quantum dots, and/or other suitable quanta.

In some embodiments, the first quantum system is input to beam splitter 206. One output of beam splitter 206 is provided to a mirror 208, while the other output of beam splitter 206 is provided to operator 210 that can include Topological Order Processing Element (TOPE) 212 and mirror 214. TOPE 212 can further arrange the entangled quanta in topological order to help prevent the waveforms from decohering as the waveforms are processed through system 108.

Topology refers to mathematical properties that are unchanged when an object is smoothly deformed. Topological ordering refers to using quasi-particles to represent quanta as the quanta move through time and space. The quasi-particles are referred to as anyons. Pairs of adjacent anyons may be moved around one another in a determined sequence to form a thread. With multiple threads, the pairs of anyons can be swapped to produce a braid of all the threads. The final states of the anyons are encapsulated in the braid and are protected from outside disturbances and interference, i.e., decoherence. Non-abelian anyons are typically used so that final states of the anyons depend on the order in which the anyons are swapped. The transformation from one state to another can be represented by a matrix. Different transformations can be used to represent different evolutions and used to encode and decode the information in the anyon braid.

The term "abelian" refers to quanta that have commutative properties, whereas "nonabelian" quanta are not commutative. In quantum mechanics, commutative means that the outcome is independent of the order of operations. If quanta have commutative properties, the outcome of operations performed on them is irrespective of the order of operations, whereas if they do not have commutative properties, the order of operations does matter. This formulation, sometimes referred to as the "braiding" formulation of quantum computing, preserves causality and thus provides the largest number of correct decrees of freedom for quantum allegories and consequently covers the broadest range of CPS verification and validation problems.

Renormalization group (RG) transformations can be used to obtain an effective description of the non-local behavior of extended systems. In the case of a system defined on a lattice, this can be achieved by constructing a sequence of increasingly coarse-grained lattices, where a single site of lattice effectively describes a block of an increasingly large number of sites in the original lattice. Entanglement renormalization is a RG transformation that uses disentanglers prior to the coarse-graining step to reduce the amount of entanglement in the system. When applied to a large class of ground states in both one and two spatial dimensions, a steady state is made possible by the disentangling step. The resulting RG transformation can be iterated indefinitely at a constant computational cost, allowing for the exploration of arbitrarily large length scales. In addition, the system can be compared with itself at different length scales, and thus RG flows can be studied in the phase space of dynamic systems. In this space the ground state can be represented as a simple tensor product.

TOPE 212 can encode information in configurations of different braids, which are similar to knots but consist of several different threads intertwined around each other. By encoding waveforms, topologically, in braids instead of single particles, the evolution of the braids can be observed in time and space. If the braids evolve in a parallel way, without intersection, there are no errors in the encoded waveforms. Entanglement renormalization transformations can be used to reduce the amount of entanglement in the waveforms. See the techniques discussed, for example, in "Entanglement Renormalization and Topological Order" by Miguel Aguado and Guifre Vidal, arXiv:0712.0348v2 [cond-mat.str-el] 21 Feb. 2008, which is incorporated by reference herein. Note that although the preceding publication discusses techniques for abelian quanta, non-abelian quanta can also be used in TOPE 112.

Figure 2B:
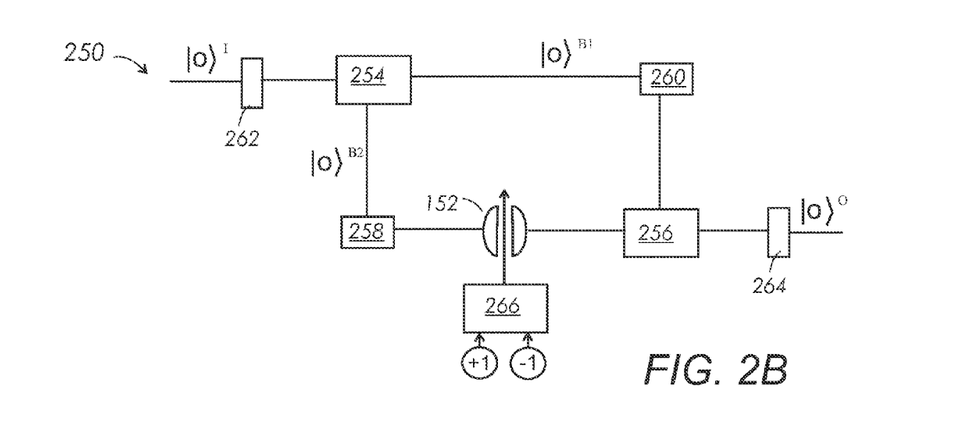
FIG. 2B is a diagram of an embodiment of the quantum processing system of FIG. 2A in which a photonic module is used to generate topological entangled renormalized quanta.

FIG. 2B shows an embodiment of photonic module 250 that can be used in TOPE 212 to generate topological entangled renormalized quanta. Photonic module 250 can include an atom cavity system 252, polarizing beam splitters (PBS) 254, 256, optical delays 258, 260, and half wave plates (HWP) 262, 264 and is described in detail in "The Photonic Module: an on-demand resource for photonic entanglement" by Simon J. Devitt et al., arXiv:0706.2226v2 [quant-ph] 12 Oct. 2007. Control lasers 266 provide a single photon source, which can produce a train of single photon pulses of known polarization, separated by a specified time interval. Cavity 252 generates two photons that are routed through components in photonic module 250 as a result of the excitation by lasers 266.

For a single photon passing through the module, the natural operation of the module, M, is given by, $$M|+\rangle |\phi\rangle \rightarrow |+\rangle^O |\phi\rangle,$$

$$M|-\rangle^I |\phi\rangle \rightarrow |-\rangle^O |\phi\rangle. \quad \text{(Equation 1)}$$

Where $|\pm\rangle = (|H\rangle \pm |V\rangle)/\sqrt{2}$, $|\phi\rangle = \alpha|0\rangle + \beta|1\rangle$ is the state of the atomic qubit, $|\phi\rangle = X|\phi\rangle = \alpha|1\rangle + \beta|0\rangle$ and indices $\{I,O\}$ represent input and output optical modes. Cavity system 252 is positioned such that the cavity mode is coupled to a spatial mode $|o\rangle^{B2}$, where o denotes the photon polarization and cavity Q-switching (which allows for the adiabatic loading of a single photon into a cavity) is employed before and after the atom/photon interaction to ensure appropriate in- and out-coupling to and from the cavity system 252. The mode $|o\rangle^{B1}$ contains an optical delay 260 equal to the time required for the photon/atom interaction. A single photon passing through the atom/cavity system 252 induces a photonic non-demolition bit-flip on the two-level atom, releasing the photon again into $|o\rangle^{B2}$ once the interaction is complete.

If the photonic state is $|+\rangle$, HWP 162 rotates the state to $|H\rangle$ after which it will continue into the mode $|o\rangle^{B1}$ and not interact with the atom. The second PBS 254 and HWP 258 will then couple $|o\rangle^{B1}$ to the output mode and rotate $|H\rangle$ back to $|+\rangle$. If the initial photonic state is $|-\rangle$, the HWP 258 will rotate the state to $|V\rangle$ and the PBS 254 will reflect the photon into the $|o\rangle^{B2}$ mode, where it flips the state of the atomic qubit. The photon is then released back into $|o\rangle^{B2}$ where the second PBS 254 and HWP 258 reflect the photon into the output mode and rotate it from $|V\rangle$ to $|-\rangle$. Therefore, the two basis states, $|\pm\rangle$, of a single photon passing through the module will enact the transformation M shown in Equation 1 above.

For a two photon train, the output pulse consists of the original two photon train which is polarization entangled into a two photon Bell state. The measurement result of the atom/cavity system 252 does not collapse the photons to unentangled states.

Quantum processing system 108 can make pronouncements based on experimentation in adjusting TOPE 212. When the experiments are classical in character, the oracle's pronouncements are computable. When the experiments are quantum mechanical in nature, the pronouncements may be either computable or non-computable.

Referring to FIG. 2A, the output of mirror 208 and TOPE 212 are provided to interferometer 218. Control computer 106 is coupled to provide inputs to control operation of TOPE 212 and interferometer 218. Measurement system 220 can measure whether the correct answer to the non-computable functional has been achieved, for example, whether the initial input and the derived reverse input are the same or similar.

In some embodiments, control computer 106 adjusts TOPE 212 to use the quantum allegory to transform the first quantum system into a second quantum system. Computer 106 can further adjust the rotation of interferometer 218, which combines the complement of the encoded non-computable functional from mirror 208 with the second quantum system from TOPE 212. In some embodiments, a "correct" solution to the non-computable functional is achieved when measurement system 220 determines that phase of the second quantum system is cancelled by the complement of the first quantum system.

Quantum operator 210, whether binary or "n-ary", can implement a property called "closure" to allow the members of a computable or non-computable subset to be combined to stay within the starting subset. In other embodiments, operator 210 can implement movement of elements between subsets or create new subsets by combining elements and mapping them into subsets other than the subset they came from, thus implementing the opposite of closure in a limited sense.

Figure 3:
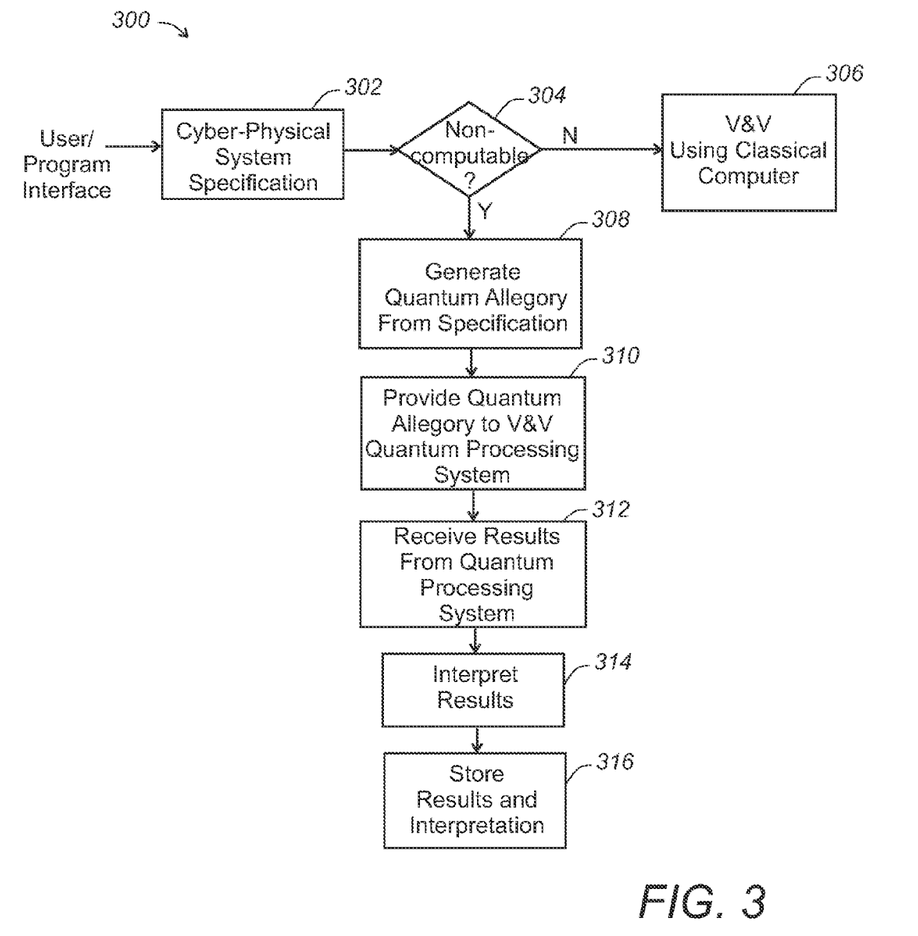
FIG. 3 is a block diagram of an embodiment of a process for generating a quantum allegory as a verification and validation oracle using the system of FIG. 1A.

Referring to FIG. 3, a block diagram of an embodiment of a process 300 for generating a quantum allegory to be used in the systems 100, 200 of FIGS. 1A and 2A is shown. A data set is a "state" if knowing that data at one instance in time allows knowledge of the data for all instances of time. The set of all possible states is called "phase space". The "Hamiltonian" of a system is an operator that determines how the system evolves in phase space over time. So phase space is potentially covered with trajectories of the system (different Hamiltonians, etc.). A computer program is, in essence, the description of the internal states through which a computer evolves. So the set of all possible states of a computer is a phase space. Any given program is a collection of possible trajectories and each run of that program is a single trajectory through that phase space. In a cyber-physical system, there can also be the physical layer which is a real hardware system. Each hardware system then has a trajectory through its own phase space which might well be defined by the position and momentum of its component elements. For example, the elements can be electrons in an electronic circuit, teeth of a gear, an entire airplane, or whatever the system undergoing verification and validation testing may require. So the physical system will have trajectories as well. Two phase spaces between a physical system and a software (cyber) system must be homologous because for each trajectory in the one, there is a corresponding trajectory in the other. Process 300 sets up an experiment using "derivation rules" of correspondence in which a real physical system mimics the trajectory of the software program.

Process 302 includes receiving information such as a formal specification and software code for a cyber-physical system from a user and/or program interface.

Process 304 determines whether the verification and validation problem for the CPS is so complex (i.e., non-computable) as to be intractable, or is otherwise not solvable classically that quantum processing is required. If not, operation of the CPS can be verified and validated using classical processing techniques in process 306. If the V&V problem is non-computable, process 308 generates a quantum allegory in the form of a thermodynamical allegory such as a Quadratic Unconstrained Binary Optimization (QUBO) problem. The thermodynamical allegory is derived from a logical model or representation of the CPS. The representation can be formed from one of many types of reversible thermodynamical processes based on the invariants and the requirements of the CPS. That is, the invariants/requirements are fundamentally identical to a satisfiability problem, which is an expression consisting of Boolean variables often expressed in conjunctive normal form. Satisfiability problems may be re-written as QUBOs by encoding the Boolean expression's elements as weighted relationships between every combination of two variables. Note that such a QUBO encoding is identical to translating the problem to a weighted maximum satisfiability problem with clauses restricted to have at most 2 literals (MAX 2-SAT) or constructing a Hamiltonian matrix that represents the same relationships.

The thermodynamical allegory is provided to a V&V quantum processing system in process 310 along with the non-computable problem itself. The oracle runs the thermodynamical allegory in the quantum processing system to ultimately search over the entire space of invalid outputs to find any occurrence of valid inputs. Running the processing system produces a probability distribution that will tend to make the valid inputs appear often over repeated simulations and so all valid inputs that cause invalid outputs will eventually be revealed after a statistically sufficient number of runs. The oracle provides information that would otherwise not be available to the quantum processing system.

When the oracle runs the thermodynamical allegory, the process can involve a type of quantum-simulated-annealing one example of which is the quantum adiabatic theorem. Basically, the thermodynamical allegory is physically manifested by applying currents and fields to a set of qubits and allowing the system to evolve while its energy state is cycled up and down gradually reducing the overall temperature (mean energy state) of the system. As the temperature is driven towards the minimum allowable temperature in the system, the final currents and fields of the qubits approach the "ground state" of the solution. Because the thermodynamical allegory encodes a problem whereby the ground state corresponds to some condition of error (or equivalently a condition with no error), the state reveals if there exists any input sequence that violates the invariants (or that no such input sequence exists). When the thermodynamical allegory encodes the ground state as error-free, the probability of error can be estimated by measuring distance to, that is, the mean temperature delta above the ground state temperature.

Process 312 can include receiving the results from the quantum processing system, which can include a probability of correctness P(C) and information regarding interim states of the CPS. The results can be interpreted in process 314, which determines whether the P(C) is equal to zero. If so, then the representation is not reversible and there is a fault or failure in the cyber-physical system. Other results such as information regarding invariants and interim states can be used to determine the location where the error occurred in the representation of the cyber-physical system. Knowledge of the location where a fault has occurred allows the problem in the CPS to be corrected much more quickly than traditional debugging and troubleshooting methods.

Process 316 stores the results and the interpretation of the results for later access and analysis via a user and/or program interface, or other suitable interface.

Figure 4:
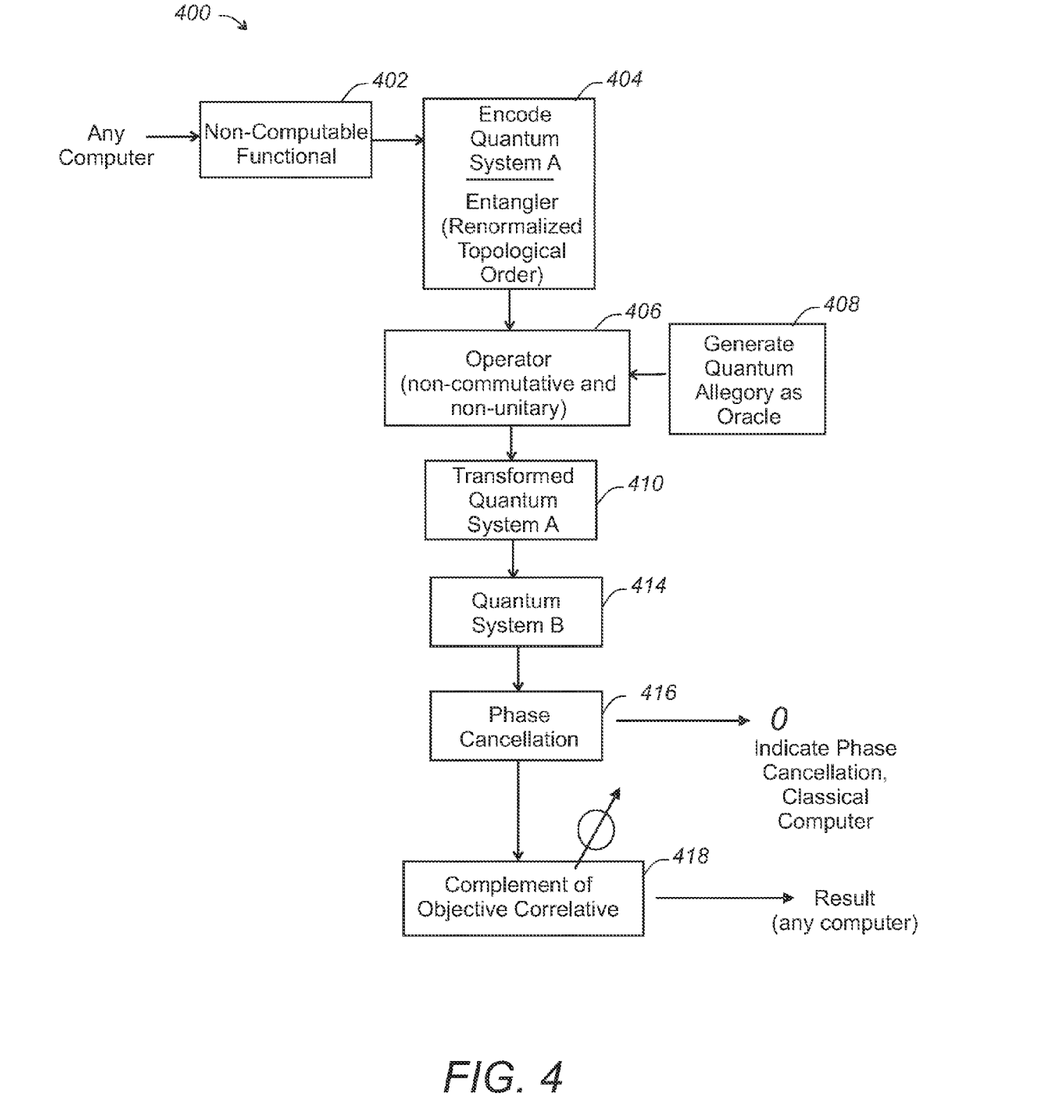
FIG. 4 is a flow diagram of an embodiment of a process for using the quantum verification and validation system of FIG. 2A for cyber-physical systems.

FIG. 4 is a block diagram of an embodiment of a process 400 for using a quantum allegory of system being tested in an oracle for a verification and validation system 100 (FIG. 1A). Process 402 includes receiving a non-computable functional from any type of deterministic computer including classical Turing Machine computers or quantum computers behaving as if operating classically. The non-computable functional is encoded into a quantum representation, denoted by quantum system A, in process 404. The encoding process may be implemented using attributes such as spin, polarization, or momentum, for example, of photons, electrons, atoms, simulated atoms such as quantum dots, and other suitable quanta. Process 404 of encoding quantum system A can also include applying topological order to quantum system A. The topological order can encode information in configurations of different braids, which are similar to knots but consist of several different threads intertwined around each other. Further, quantum system A can be represented redundantly so that errors can be diagnosed and corrected if the coherence is disrupted during propagation and/or processing.

Processes 406 through 410 include applying an operator and renormalized topological ordering to transform quantum system A to quantum system B. Process 408 can include generating a quantum allegory of quantum system A that is executed by an oracle. In some embodiments, quantum system A is transformed or rotated in a manner that is pertinent to the non-computable functional based on the quantum allegory in process 410. In these embodiments, quantum system A is a topological order quantum system. The evolution of quantum system A can be governed by a non-commutative, non-unitary processing system 108. The relations between the elements of the processing system 108 depend on the previous encoding process 404. Using the encoding relation, we can find the topological invariants of the quantum system A. The topological invariants are the quantum allegories that define the transformations of the quantum system A to quantum system B.

The output of process 410 is quantum system B, as shown by process 414. Process 416 combines the complement of quantum system A with quantum system B. The process of combining quantum system A and B can be implemented using an interferometer. Process 418 determines whether the complement of quantum system A cancels the phase of quantum system B. If so, a solution to the non-computable functional has been found. Otherwise, processes 406-418 can be repeated using another quantum allegory in the oracle.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

What is claimed:

1. A computer system comprising:
   an oracle machine including a control computer and a quantum processing system that serves as an oracle to the control computer;
   a quantum allegory generator that maps a specification for a system undergoing verification and validation testing to a thermodynamical allegory; and
   the quantum processing system is configured to execute the thermodynamical allegory to determine whether there is a set of variables that satisfy the thermodynamical allegory, and if there is a set of variables that satisfy the thermodynamical allegory, whether the system encoded by the thermodynamical allegory has one or more faults.

2. The computer system of claim 1 wherein the thermodynamical allegory is structured as at least one of the group consisting of: a Quadratic Unconstrained Binary Optimization problem, a search for singularities in a topological manifold, and a search for irreversibilities in a quantum physical process.

3. The computer system of claim 2, further comprising:
   a quantum system compiler that provides a non-computable functional for the system being tested and the thermodynamical allegory to the control computer.

4. The computer system of claim 1 further comprising:
   an interface that receives data input for at least a portion of the system to be tested, the data input includes at least one of the group consisting of: system requirements, system specifications, data representing a physical embodiment of a hardware system, and software code.

5. The computer system of claim 4, further comprising:
   a preprocessor configured to
   receive the data input from the interface, and
   determine whether the at least a portion of the system will be tested using a classical problem solver or the quantum processing system.

6. The computer system of claim 1, further comprising:
   an interface that receives results of the verification and validation testing from a repository, the results include at least one of the group consisting of: an indication of whether a fault was detected during the testing, and a state of the system being tested when the fault was detected, wherein the location of the fault in the system is determined from the state.

7. The computer system of claim 1, further comprising:
   a preprocessor configured to provide data input for at least a portion of the system to be tested using the quantum processing system to a quantum system compiler; and
   the quantum system compiler prepares a representation of the data input in a form of a thermodynamical process.

8. The computer system of claim 1, further comprising:
   a quantum system compiler configured to receive a logical representation of the system being tested and generate a thermodynamical allegory.

9. The computer system of claim 1, further comprising:
   the quantum processing system configured to
   receive a thermodynamical allegory representing the system being tested;
   fix the output of the thermodynamical allegory for a given initial input; and
   run the thermodynamical allegory backward to generate a reverse input.

10. The computer system of claim 9, further comprising:
    a results interpreter configured to determine whether the reverse input is not the same as the initial input, and if the initial input and the reverse input are substantially different, the system being tested cannot be verified as being free of errors.

11. The computer system of claim 10, wherein the control computer is configured to:
    queue jobs for the quantum processing system,
    provide an interface between the quantum processing system and the quantum allegory generator, and
    supply the results from the quantum processing system to the results interpreter.

12. The computer system of claim 1, further comprising:
    a results interpreter configured to determine the location of an error in the system based on state information from the quantum processing system.

13. A method comprising:
    receiving information for a system to be tested;
    determining whether the system can be tested using a classical computer system;
    if the system cannot be tested using the classical computer system:
      generating a quantum allegory of the system in the form of a thermodynamical allegory from the information; and
      running the thermodynamical allegory in a quantum simulator as an oracle to the classical computer system to determine whether the system is likely to incur a failure during operation.

14. The method of claim 13, further comprising:
    the information about the system to be tested includes at least one of the group consisting of: system requirements, system specifications, data representing a physical embodiment of a hardware system, and software code.

15. The method of claim 13, further comprising:
    generating results from the running of the thermodynamical allegory including at least one of the group consisting of:
      an indication of whether a fault was detected during the testing,
      a state of the system being tested when the fault was detected, and the location of the fault in the system based on the state.

16. The method of claim 13, further comprising:
    determining whether the at least a portion of the system will be tested using the classical computer.

17. The method of claim 13, further comprising:
    generating the quantum allegory includes preparing a representation of the information in logic form based on a thermodynamical process.

18. The method of claim 13, further comprising:
    fixing the output of the thermodynamical allegory for a given initial input; and running the thermodynamical allegory backward to generate a reverse input.

19. The method of claim 18, further comprising:
    determining whether the reverse input is not the same as the initial input, and if the initial input and the reverse input are substantially different, determining that the system being tested cannot be verified as being free of errors.

20. A processing system comprising:
a quantum allegory generator configured to map information for a system undergoing verification and validation testing to a quantum allegory;
a quantum computer system operable to execute the quantum allegory in forward and in reverse; and
a results interpreter configured to determine that the system is likely to be free of errors within a specified probability when the quantum allegory generates repeatable solutions in forward and in reverse.

21. The processing system of claim 20 wherein the quantum allegory is structured as at least one of the group consisting of: a thermodynamical allegory, a search for singularities in a topological manifold, and a search for irreversibilities in a quantum physical process.

22. The processing system of claim 20 further comprising:
an interface that receives the information for the system and provides the information to the quantum allegory generator, the information includes at least one of the group consisting of: system requirements, system specifications, data representing a physical embodiment of a hardware system, and software code.

23. The processing system of claim 20, further comprising:
the results interpreter configured to receive results of the verification and validation testing, the results include at least one of the group consisting of: an indication of whether a fault was detected during the testing, and a state of the system being tested when the fault was detected, wherein the location of the fault in the system is determined from the state.

24. The processing system of claim 20, further comprising:
a preprocessor configured to
receive the information for the system being tested, and
determine whether at least a portion of the system will be tested using a classical computer or the quantum computer system.

25. The processing system of claim 20, further comprising:
a preprocessor configured to provide the information for at least a portion of the system to be tested using the quantum computer system to a quantum system compiler; and
the quantum system compiler prepares a representation of the information in logic form.

26. The processing system of claim 20, further comprising:
a control computer configured to
receive a thermodynamical allegory representing the system being tested;
fix the output of the thermodynamical allegory for a given initial input; and
instruct the quantum computer system to run the thermodynamical allegory backward to generate a reverse input.

27. The processing system of claim 26, further comprising:
a results interpreter configured to determine whether the reverse input is not similar to the initial input, and if the initial input and the reverse input are substantially different, the system being tested cannot be verified as being free of errors.

28. The processing system of claim 20, further comprising:
the results interpreter is further configured to determine the location of an error in the system based on state information from the quantum computer system.

* * * * *